United States Patent Office 2,964,461
Patented Dec. 13, 1960

2,964,461

LEADED SOLID CATALYST OR ADSORBENT PARTICLES AND PROCESSES EMPLOYING THE SAME

Austin B. Chinn, Salt Lake City, Utah, assignor, by mesne assignments, to California Research Corporation, San Francisco, Calif., a corporation of Delaware No Drawing. Filed Nov. 5, 1957, Ser. No. 694,519

8 Claims. (Cl. 208—47)

This application is a continuation-in-part of application Serial No. 396,750, filed December 7, 1953, now abandoned.

This invention relates to a process for treating high-surface area refractory particles useful in catalytic conversion and separation processes of the moving bed type, to the resulting particles, and to processes employing such particles. More particularly, the invention has to do with the treatment of solid catalyst or adsorbent particulate material with a plumbic or lead material, with the resulting lead treated material, and with catalytic conversion and separation processes, including catalytic cracking and reforming of hydrocarbons, and adsorption processes utilizing the lead-treated material.

As is known, high-surface area refractory solid materials in particle form of the nature of natural and treated clays or of certain synthetic so-called "gel-type" compositions involving silica and/or alumina, and which may have certain metal oxides associated therewith, e.g., molybdenum oxide, are extensively employed in catalytic conversion and separation processes. As is also known, this particulate solid material is available in a variety of forms, e.g., beads, pellets and in such granular form as to permit fluidized solids operations.

In processes of the moving bed type the solid particulate material is subject to much mechanical handling with consequent degradation of the solid particulate material. As an example of such processes may be mentioned the catalytic cracking of hydrocarbon vapors. As is well known, gas oils boiling within about the range of 450° F. to 750° F. are subjected to temperatures in the order of 800° F. and higher, in the presence of a cracking catalyst, e.g., of the silica-alumina type, whereby the hydrocarbon vapors are converted into lighter more valuable products, including gasoline. During the conversion, carbonaceous deposits form on the catalyst which impair its efficiency. Generally, therefore, the cracking process involves a treating or reaction zone wherein conversion of the hydrocarbons occurs, and a regeneration zone wherein the carbonaceous deposits are removed or burned from the catalyst in the presence of oxygen-containing gas and at elevated temperatures of the order of 900° F. to 1200° F., the catalyst being thus reactivated. In carrying out the cracking process, the catalyst continuously moves as an endless stream in, and out of, the reaction or treating and regeneration zones. In cycling or circulating through the system, the catalyst undergoes severe mechanical action. As a result of this mechanical action, which involves abrasion, rubbing and attrition of the catalyst particles among one another, degradation of the particles to particles of much smaller size than those originally charged to the process occurs. These smaller dust particles, or fines, which are substantially valueless as catalyst material, represent high attrition losses and are undesirable in that catalyst is not only lost from the process as fines, but is also carried over with, or entrained in, the hydrocarbon vapors leaving the treating zone, thereby being lost to the process.

Thus, in a typical cracking operation wherein 300 tons of catalyst are circulated per hour, the loss of catalyst due to attrition and removed from the system is of the order of 3 tons per day.

According to the present invention, the severe attrition losses heretofore characteristic of moving bed or fluid hydrocarbon conversion processes or separation systems, such as adsorption, catalytic reforming, desulfurization, and catalytic cracking, can be markedly reduced by the use of catalyst or adsorbent particles treated to impart thereto a low coefficient of friction.

It has been found that catalyst or adsorbent particles coated with a thin and adherent film or layer of plumbic material comprising lead or lead compounds or mixtures of these result in particles having a low coefficient of friction. Due to this property, lubrication between coated particles occurs, with consequent reduction of attrition and abrasion of the particles. It has also been found that a satisfactory film or layer of the plumbic material can range from about $10^{-5}$ mm. to about $10^{-2}$ mm. in thickness. Surprisingly, these films are pervious and permit full, normal contact of reactants, reaction products or components in separation systems with the highly extended internal surfaces of the catalyst and adsorbent particle masses. Another unexpected phenomenon characterizes the present invention. Thus, while heavy metals, including lead, are regarded as catalyst poisons particularly of the silica-alumina type catalyst employed in catalytic cracking of hydrocarbons, the leaded catalyst of the present invention, as will hereinafter be shown, has no adverse effects on the cracking reaction in regard either to product yield or undesirable side reaction products.

As indicated, the catalyst or adsorbent particles may be in bead form, in the form of tablets or pellets or may be of the extruded type or in the form resulting from grinding and sizing larger catalyst or adsorbent solid masses.

A number of expedients of providing the catalyst particles with the thin outer adherent coat of plumbic material contemplated by the invention suggest themselves to the man skilled in the art. One method involves impregnation of the preformed particulate solid with a lead compound such as tetraethyl or tetraphenyl lead highly diluted in a nonionic solvent, such as a hydrocarbon liquid, the use of the nonionic solvent serving to prevent too rapid and extensive penetration of the lead compound into the porous particulate solid. Another method involves contacting of a volatile and decomposable organo-lead compound, such as tetramethyl, -ethyl, or -phenyl lead with the particulate solid particles at high temperature of the particles and high dilution of the lead compound vapors to produce a thin film of plumbic material on the particles. Still another method involves mechanically contacting the particulate solid with a solid plumbic material, such as lead oxide or carbonate or chromate, and the like, including various lead minerals, e.g., litharge, and organic compounds, e.g., lead oleate, followed by removal of excess lead compound, and heat treatment of the coated particles to render the coating adherent. Such heat treatment may be carried out under an oxidizing atmosphere as encountered in conventional moving bed or catalytic processes.

However, an especially convenient and economical method of producing pervious, adherent, and low friction films on the catalyst or adsorbent particles is during operation, hereinafter illustrated in connection with the conventional moving bed catalytic cracking process of the "Houdriflow" type employing the silica-alumina gel bead catalyst particles available commercially. In accordance with this method, a suitable quantity of a lead compound in solid or solution form (e.g., a slurry of powdered lead oxide) is added continually to the hydrocarbon feed or a recycle stream. This method has the additional advantage that the film of lead material is maintained on the catalyst particles, thus replacing any lead material which might be removed from the surfaces of the catalyst particles through the wearing off thereof. Suitable rates of addition of the organo-lead compound, such as tetraethyl lead, are such as to introduce into the system the equivalent of from about 1 pound per day of lead per 10 tons of catalyst circulation per hour, to about 1 pound per day of lead per 0.5 ton per hour of catalyst circulation. A preferred amount in a moving bed catalytic system of the "Houdriflow" type employing gas lift for the catalyst is 1 pound per day of lead, based on lead, per 1 to 3 tons per hour of catalyst circulation.

Samples of regenerated catalyst before and after treatment with lead in operations of the type hereinabove described show little, if any, diminution in activity when subjected to the conventional "Activity Test." This test has been adopted in the petroleum industry as the standard procedure for the determination of the activity of all pelleted and bead form cracking catalysts. It is known as the "Cat-A" test and is described in Report No. SG–42, May 1, 1952, of the Houdry Process Corporation. In this method a standard charging stock (a light East Texas gas oil) is passed over a bed of catalyst of unknown activity under the following conditions: rate, 5 cc. per minute per 200 cc. of catalyst; temperature, 800° F.; steam, none; pressure, atmospheric; time on stream, 10 minutes. The gasoline yield (volume percent of the charge) is determined by a distillation of the synthetic product and is reported as the activity index of the catalyst. The specific gravity of the gas and weight percent yields of gas and coke are also reported. The gas yield is determined by collection over water, and the coke by combustion with air and absorption of the resulting $CO_2$ in a solid absorbent.

Representative activity determinations made according to the above procedure with catalyst samples both before and after treatment with lead give the following results:

TABLE I

"Cat-A" test of
leaded and unleaded catalyst

| | Unleaded Catalyst | Leaded Catalyst |
|---|---|---|
| Gas, wt. percent on feed | 4.25 | 4.00 |
| Gas Gravity (relative to air) | 1.39 | 1.43 |
| Coke on Catalyst, wt. percent of frac | 1.96 | 1.90 |
| Gasoline, vol. percent of charge (Activity Index) | 30.2 | 31.1 |

It will be noted from an inspection of the table that gas formation and coking are less pronounced and that gasoline production is slightly increased with the leaded catalyst. These results are believed unexpected in view of the following considerations which are known to apply to the cracking art. Generally, the presence of heavy metal in the catalyst results in poisoning of catalyst which in turn results in an increase in gas formation and a decrease in the gravity of the gas formed. This is due to the fact that such metals are dehydrogenators and tend to promote the production of the ligher hydrogen and methane gases from the charging stock instead of the more useful heavier materials, such as gasoline. Further, the amount of feed stock converted to coke increases, with resultant difficulty in reactivation of the catalyst because the coke on the catalyst must be oxidized before the catalyst can be returned to the reactor. It will be noted in the above table that these effects do not result from surface leading of the cracking catalyst.

In the commercial moving-bed cracking operation hereinabove described the roughly spherical catalyst beads employed average about 0.1 inch in diameter. In their regenerated state, untreated by the process of the present invention, the beads are greenish-white and translucent in appearance, the green being due to the presence of a small amount of chromium compound added to assist regeneration. When examined under low power magnification the particles are rough and pitted because of the severe grinding action which takes place in the moving beds, and many of the beads show small cracks and incipient fractures. On the other hand, beads treated by the process of the present invention are olive-green to brownish-green in color. The color is believed to be due to the presence of lead oxide formed in the regeneration step. When fractured for examination, beads treated with lead in the amounts and manner recommended herein exhibit the color of the untreated beads below the surface, and exhibit the olive- to brownish-green color only on the surface. When subjected to violent attrition under conditions hereinafter detailed and much more severe than those that prevail in actual service, the leaded beads lose their outer surface with formation of a finely divided material which shows a lead content of at least an order of magnitude higher than that which exists in the interior of the particle. Thus, the surface fines from leaded beads contained about 0.12 wt. percent lead, whereas untreated beads, and averaged whole treated beads both contained about 0.007 wt. percent of lead, within the experimental accuracy of the analysis.

The process of this invention is illustrated by the examples given below wherein leaded coatings are applied to masses of discrete catalyst particles under controlled conditions simulating those encountered in actual refinery practice. In making these tests, the amounts of lead-containing additives employed were so chosen as to correspond to the total amount of said additive which would normally be laid down on the catalyst over the course of a one or two-week operating period involving addition of the lead compound to the moving bed cracking unit at a rate corresponding to about 1 pound, per day, of the additive compound (calculated as Pb) for each two tons per hour of circulating catalyst. The results obtained in these tests, as regards both catalyst attrition and catalyst activity, have been found to correlate well wih those obtained in actual plant operation.

EXAMPLES 1–3

In the operations covered in these examples, a lead coating was provided on synthetic, silica-alumina beads having an average diameter of about ⅛" and containing approximately 87% silica. The resistance of the leaded beads against breakage and other attritional losses was then measured. Table II summarizes the data so obtained. The catalyst employed in making these tests represented an equilibrium mixture taken from a moving bed type of catalytic cracking unit, in this case one wherein lifting of the beads is effected by a bucket hoist.

The technique employed in providing the lead coating on the catalyst particles (other than the "control" of Example 1) was to select a 600 g. sample of essentially whole catalyst particles and to bring said sample to 900° F. in a rotating muffle furnace. The heated catalyst particles (which were relatively free of any carbonaceous deposits) were then sprayed over the course of one minute with 30 cc. of a high boiling gas oil containing a total of 1.38 g. of the desired additives (1.93 g. in the case of tetraethyl lead), said additives being present in finely divided (powdered) form except for the run conducted with TEL (Example 3) wherein the additive was dissolved in the gas oil. Following the addition of the oil-additive mixture, the temperature of the catalyst was gradually raised to 1100° F. over the course of the ensuing 10 minutes. During the last seven minutes of said period, and for the next 33 minutes, air was passed through the hot (1100° F.) catalyst to burn the carbonaceous deposits present thereon. Steam, at the rate of 90 cc. $H_2O$/hr., was added during the entire operation, the more closely to simulate conditions encountered in actual operation of the refinery unit.

The treated catalyst beads were cooled and tested for resistance to loss by attrition. In making this test, 200 g. of beads of a size sufficient to be retained on a 10-mesh screen were placed in a unit having a closed, circular path wherein the beads were introduced approximately every five seconds during the 15-minute test periods into a rising air blast (30 p.s.i.g.) for discharge against the lower side of a steel plate having a dependent skirt portion serving to return the beads into the lower portion of the unit for reintroduction into the rising air stream. Portions of the fines produced during the tests were carried out with the escaping lift gases, while the remaining fines and other small catalyst fragments formed were separated as the beads remaining on a 10-mesh screen were segregated and weighed. The relative differences in weight between the original sample (200 g.) and that of the on-10-mesh material remaining at the conclusion of the run is regarded as an indicium of the resistance of the beads to attrition in actual plant use.

TABLE II

| Example No. | Additive | Attrition Loss (Weight Percent) |
|---|---|---|
| 1 | Control | 7.8 |
| 2 | PbO | 3.5 |
| 3 | Pb($C_2H_5$)$_4$ | 6.4 |

In the case of the run reported above in Table II which was conducted with lead oxide, the finished catalyst appeared to have a hard, shiny coating. This was not the case, however, when tetraethyl lead was employed, for here the coated catalyst, while discolored, otherwise had the general appearance of the untreated catalyst.

I claim:

1. In a catalytic conversion process of converting hydrocarbon oils into more useful products, including gasoline, and wherein the hydrocarbon oil feed is introduced into a treating zone and brought into contact with solid catalyst particles at elevated temperatures and superatmospheric pressures, and the catalyst particles reactivated in a regeneration zone, the said solid catalyst particles continuously moving in, out of, and returned to, said treating and regeneration zones in the form of an endless stream, as a result of which the catalyst particles are subjected to a mechanical abrading, attrition action to give high attrition losses of smaller particles eliminated from the process as fines, the improvement of reducing said attrition losses which comprises continually introducing into said treating zone along with the hydrocarbon oil feed a plumbic material to provide the catalyst particles with a thin, pervious film of plumbic material to substantially lower the coefficient of friction of the particles.

2. In the process of catalytically cracking hydrocarbon oils to convert said hydrocarbon oils into lighter more useful products, including gasoline, and wherein the hydrocarbon oil feed is introduced into a treating zone and brought into contact with solid cracking catalyst particles under cracking conditions, and the catalyst particles reactivated in a regeneration zone, the said solid cracking catalyst particles continuously moving in, out of, and returned to, said treating and regeneration zones in the form of an endless stream, as a result of which the catalyst particles are subjected to a mechanical abrading, attrition action to give high attrition losses of smaller particles eliminated from the process as fines, the improvement of reducing said attrition losses which comprises continually introducing into said treating zone along with the hydrocarbon oil feed a plumbic material to provide the catalyst particles with a thin, pervious film of plumbic material to substantially lower the coefficient of friction of the particles.

3. The improvement according to claim 2, wherein the cracking catalyst particles are of the silica-alumina gel type.

4. The improvement according to claim 3, wherein the amount of plumbic material charged along with the hydrocarbon oil feed ranges from about 1 pound per day of lead, based on lead, per 10 tons per hour of circulating catalyst to 1 pound per day of lead, based on lead, per 0.5 ton per hour catalyst circulation.

5. The improvement according to claim 4, wherein the catalyst is in bead form.

6. The improvement according to claim 5, wherein the plumbic material comprises an organo-lead compound.

7. The improvement according to claim 6, wherein the plumbic material comprises tetraethyl lead.

8. The improvement according to claim 6, wherein the plumbic material is added in an amount sufficient to coat the catalyst particles with a film having a thickness within about the range of $10^{-5}$ mm. to $10^{-2}$ mm.

References Cited in the file of this patent

UNITED STATES PATENTS

| | | |
|---|---|---|
| 1,963,245 | Pier | June 19, 1934 |
| 2,368,261 | Neef | Jan. 30, 1945 |
| 2,369,558 | Gilbert | Feb. 13, 1945 |
| 2,392,846 | Friedman | Jan. 15, 1946 |
| 2,440,591 | Lewis | Apr. 27, 1948 |
| 2,514,497 | Jones | July 11, 1950 |
| 2,517,006 | MacLean | Aug. 1, 1950 |
| 2,547,015 | Kirkbridge | Apr. 3, 1951 |
| 2,714,085 | Thacker et al. | July 26, 1955 |
| 2,745,812 | Ries | May 15, 1956 |
| 2,783,211 | McKinley | Feb. 26, 1957 |